United States Patent [19]

Bier

[11] Patent Number: 4,489,110

[45] Date of Patent: Dec. 18, 1984

[54] POLYETHYLENE TEREPHTHALATE MOULDING COMPOSITIONS HAVING HIGH REFLECTIVITY

[75] Inventor: Peter Bier, Krefeld, Fed. Rep. of Germany

[73] Assignee: Bayer Aktiengesellschaft, Leverkusen, Fed. Rep. of Germany

[21] Appl. No.: 515,728

[22] Filed: Jul. 21, 1983

Related U.S. Application Data

[63] Continuation of Ser. No. 339,599, Jan. 15, 1982, abandoned.

[51] Int. Cl.³ .............................................. C23C 11/00
[52] U.S. Cl. ................................. 427/250; 106/288 B; 106/291; 427/316; 428/687; 264/1.1; 264/1.9; 524/447; 524/605
[58] Field of Search ................. 524/447, 605; 264/1.1, 264/1.9; 428/687; 106/288 B, 291; 427/250, 316

[56] References Cited

U.S. PATENT DOCUMENTS

| | | | |
|---|---|---|---|
| 3,058,671 | 10/1962 | Billue | 106/23 |
| 3,171,718 | 3/1965 | Gunn et al. | 106/291 |
| 3,516,957 | 6/1970 | Gray, Jr. et al. | 524/315 |
| 3,692,744 | 9/1972 | Rich et al. | 260/75 T |
| 3,798,044 | 3/1974 | Whitley et al. | 106/288 B |
| 3,862,084 | 1/1975 | Zandstra et al. | 524/605 |
| 3,914,471 | 10/1975 | Cobb et al. | 427/316 |
| 3,963,669 | 6/1976 | Wurmb et al. | 260/40 R |
| 4,052,356 | 10/1917 | Breitenfellner et al. | 260/40 R |
| 4,112,190 | 9/1978 | Sato et al. | 427/250 |
| 4,125,411 | 11/1978 | Lyons | 106/288 B |
| 4,188,358 | 2/1980 | Withoos et al. | 264/1.9 |
| 4,212,791 | 7/1980 | Avery et al. | 524/447 |

FOREIGN PATENT DOCUMENTS

| | | | |
|---|---|---|---|
| 44-15191 | 7/1969 | Japan | 524/605 |
| 52-14675 | 2/1977 | Japan | 524/447 |

*Primary Examiner*—Melvyn I. Marquis
*Attorney, Agent, or Firm*—Gene Harsh; Lawrence S. Pope; Aron Preis

[57] ABSTRACT

Polyethylene terephthalate moulding compositions which contain delaminated kaolin may be processed into highly-reflecting objects.

11 Claims, No Drawings

POLYETHYLENE TEREPHTHALATE MOULDING COMPOSITIONS HAVING HIGH REFLECTIVITY

This application is a continuation of application Ser. No. 339,599 filed Jan. 15, 1982, now abandoned.

This invention relates to polyethylene terephthalate moulding compositions which contain delaminated kaolin. Mouldings produced from these compositions have an extremely high reflectivity after being metallised.

Polyethlyene terephthalate (PET) is not only used for fibre production, but also increasingly for the production of mouldings. There is a need for moulding compositions which may be processed into reflecting objects, for example searchlight reflectors, and these objects should have as high reflectivity as possible in a metallised condition.

It has been found that the reflectivity depends to a considerable extent on the type of fillers used, although both PET as well as filler are covered by the metal layer which is applied, and thus the man skilled in the art must be aware that they cannot contribute directly to the reflection. Surprisingly, it has been found that as a PET filler delaminated kaolin is superior to other fillers, for example mica, talcum and chalk.

Kaolin has been proposed as a filler for PET and polybutylene terephthalate to increase the arc and creep resistances (German Offenlegungsschrift No. 2,616,754, U.S. Pat. No. 4,052,356; published Japanese patent application No. 15 191/69). In addition to talcum, bentonite and glass beads, kaolin should also increase the non-flammability of polyalkylene terephthalates (German Offenlegungsschrift No. 2,408,531). None of the publications mentioned relates to moulding compositions which contain delaminated kaolin.

An object of the present invention is to provide moulding compositions comprising:
(I) from 30 to 85 parts, by weight of PET having an intrinsic viscosity of at least 0.4 dl/g (as measured using a 0.5%, by weight, solution in phenol/o-dichlorobenzene (weight ratio 60:40) at 25° C.),
(II) from 2 to 70 parts, by weight, of delaminated kaolin; and
(III) from 0 to 70 parts, by weight, or more of other fillers and/or reinforcing agents.

The present invention also provides the use of these moulding compositions for the production of searchlight reflectors.

The polyethylene terephthalates (I) contain at least 80 ml %, preferably at least 90 mol %, based on the dicarboxylic acid component, of terephthalic acid radicals and at least 80 mol %, preferably at least 90 mol %, based on the diol component, of ethylene glycol radicals.

In addition to terephthalate acid radicals, the polyethylene terephthalates (I) may also contain up to 20 mol % of radicals of other aromatic dicarboxylic acids having from 8 to 14 carbon atoms, of aliphatic dicarboxylic acids having from 4 to 8 carbon atoms or of cycloaliphatic dicarboxylic acids having from 8 to 12 carbon atoms, for example phthalic acid, isophthalic acid, naphthalene-2,6-dicarboxylic acid, diphenyl-4,4-dicarboxylic acid, adipic acid, sebacic acid and cyclohexane diacetic acid.

In addition to ethylene glycol radicals, the polyethylene terephthalates (I) may also contain up to 20 mol % of other aliphatic diols having from 3 to 12 carbon atoms, cycloaliphatic diols having from 6 to 15 carbon atoms and/or aromatic diols having from 6 to 21 carbon atoms, for example radicals of propane-1,3-diol, butane-1,4-diol, pentane-1,5-diol, hexane-1,6-diol, cyclohexane-1,4-dimethanol, 4-methyl-pentane-diol-2,4, 2-methyl-pentane-diol-2,4, 2,2,4-trimethyl-pentane-diol-1,3, 2-ethyl-hexane-diol-1,3, 2,2-diethyl-propane-diol-1,3, hexane-diol-2,5, 1,4-di-(β-hydroxy-ethoxy)-benzene, 2,2-bis-(4-hydroxy-cyclohexyl)-propane, 2,4-dihydroxy-1,1,3,3-tetramethyl-cyclobutane, 2,2-bis-(3-β-hydroxy-ethoxy-phenyl)-propane- and 2,2-bis-(4-hydroxy-propoxy-phenyl)-propane.

The polyethylene terephthalates (I) may be branched by the incorporation of relatively small quantities of tri- or tetra-hydric alcohols or tri- or tetra-basic carboxylic acids, as described in German Offenlegungsschrift No. 1,900,270 and in U.S. Pat. No. 3,692,744. Examples of preferred branching agents include trimesic acid, trimellitic acid, trimethylolethane and trimethylolpropane and pentaerythritol. It is advisable not to use more than 1 mol % of the branching agent, based on the acid component.

Those polyethylene terephthalates (I) are particularly preferred which are prepared solely from terephthalic acid or reactive derivatives thereof (for example dialkyl esters thereof) and ethylene glycol.

Various methods are known for the preparation of delaminated kaolin, for example, extruding kaolin/water mixtures or by the effect of shearing forces on an aqueous paste of kaolin and glass beads (U.S. Pat. Nos. 2,904,267; 3,798,044 and 4,125,411).

The average particle thickness of preferred delaminated kaolins is below 0.1 μm, preferably from 0.06 to 0.09 μm, and at least 90%, by weight, of the particles have a thickness of from 0.02 to 0.2 μm. The average particle diameter of preferred delaminated kaolins is from 1 to 2 μm, and at least 90%, by weight, of the particles have a diameter of from 0.5 to 4.0 μm.

Glass fibres are preferred reinforcing agents (III). However, pigments, dyes, stabilisers, nucelation agents, UV absorbers, lubricants and mould-release agents may also be added to the moulding compositions according to the present invention.

The oligoesters of the U.S. Pat. No. 4,223,113 may also be added to the present moulding compositions for improved processing at low moulding temperatures.

The components (I)–(III) and possibly other aids and additives may be mixed in a known manner, for example, in kneaders or in single- or double-screw extruders.

The injection moulding conditions for PET moulding compositions are known, see U.S. Pat. No. 3,516,957 and Ervin J. Rubin, Injection Moulding Theory and Practice, Wiley Interscience, 1972.

Parts and percentages specified in the following Examples are based on weights.

EXAMPLES

Searchlight reflectors were produced from the moulding compositions of the following Table. These reflectors were primed with a polyurethane lacquer, vapour-deposited with aluminium and provided with 50 watt halogen bulbs. A polycarbonate plate was applied using an epoxy resin adhesive, and the maximum luminous efficacy was measured.

| PET | 65% | 45% | 45% |
|---|---|---|---|
| Filler | 20% Mica | 35% Talcum | 35 del. Kaolin |

| -continued | | | |
|---|---|---|---|
| Glass | 15% | 20% | 20% |
| Luminous efficacy | 40 000 cd | 45 000 cd | 59 500 cd |
| PET | 55% | 50% | |
| Filler | 10% Mica 15% del. Kaolin | 25% del. Kaolin | |
| Glass | 15% | 20% | |
| Luminous efficacy | 56 000 cd | 59 500 cd | |

I claim:

1. A process for preparing light reflectors comprising
   (i) molding an article using a composition comprising
      (I) from 30 to 85 parts by weight of polyethylene terephthalate having an intrinsic viscosity of at least 0.4 dl/g as measured by using a 0.5%, by weight solution in phenol/o-dichlorobenzene (weight ratio 60:40) at 25° C.:
      (II) from 2 to 70 parts, by weight, of delaminated kaolin; and
      (III) from 0 to 70 parts, by weight, of fillers other than delaminated kaolins and/or reinforcing agents and
   (ii) metallizing at least a portion of said article.

2. The process of claim 1 wherein at least 90% by weight of said delaminated kaolin have particle thicknesses of from 0.02 to 0.2 microns.

3. The process of claim 1 wherein said delaminated kaolin is characterized in that its average particle thickness is less than 0.1 micron.

4. The process of claim 1 wherein said delaminated kaolin has an average particle thickness of from 0.06 to 0.09 microns.

5. The process of claim 1 wherein at least 90% by weight of said delaminated kaolin has a diameter of from 0.5 to 4.0 microns.

6. The process of claim 1 wherein said delaminated kaolin has an average particle diameter of from 1 to 2 microns.

7. The process of claim 1 wherein said reinforing agent is glass fibers.

8. The light reflector prepared by the process of claim 1.

9. A process for preparing light reflectors comprising
   (i) molding an article from a composition comprising
      (a) from 30 to 85 parts by weight, of polyethylene terephthalate having an intrinsic viscosity of at least 0.4 dl/g as measured using a 0.5% by weight solution in phenol/o-dichlorobenzene (weight ratio 60:40) at 25° C., and
      (b) from 2 to 70 parts by weight of delaminated kaolin
   (ii) priming at least a portion of said article and
   (iii) metallizing said portion.

10. The process of claim 9 wherein said metallizing consists of applying aluminum by vapor deposition.

11. The process of claim 10 wherein said priming consists of polyurethane lacquering.

* * * * *